United States Patent
Vissenberg et al.

(10) Patent No.: US 9,615,422 B2
(45) Date of Patent: Apr. 4, 2017

(54) AUTO COMMISSIONING AND ENERGY SAVING LIGHTING SYSTEM

(75) Inventors: Michel Cornelis Josephus Marie Vissenberg, Roermond (NL); Ramon Pascal van Gorkom, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/240,142

(22) PCT Filed: Aug. 27, 2012

(86) PCT No.: PCT/IB2012/054378
§ 371 (c)(1),
(2), (4) Date: Feb. 21, 2014

(87) PCT Pub. No.: WO2013/030748
PCT Pub. Date: Mar. 7, 2013

(65) Prior Publication Data
US 2014/0191666 A1    Jul. 10, 2014

Related U.S. Application Data

(60) Provisional application No. 61/530,486, filed on Sep. 2, 2011.

(51) Int. Cl.
*H05B 33/08* (2006.01)
*H05B 37/02* (2006.01)

(52) U.S. Cl.
CPC ..... *H05B 33/0854* (2013.01); *H05B 37/0245* (2013.01); *Y02B 20/40* (2013.01)

(58) Field of Classification Search
CPC ............ H05B 37/0245; H05B 37/0272; H05B 33/0815; H05B 33/0827; H05B 33/0842;
(Continued)

(56) References Cited

U.S. PATENT DOCUMENTS

| 5,245,331 A | * | 9/1993 | Gibbons ........................ 340/9.1 |
| 2004/0232851 A1 | | 11/2004 | Roach et al. |

(Continued)

FOREIGN PATENT DOCUMENTS

| CN | 101112126 A | 1/2008 |
| CN | 101861043 A | 10/2010 |

(Continued)

*Primary Examiner* — Tuyet Vo
*Assistant Examiner* — Amy Yang

(57) ABSTRACT

The invention relates to a network of luminaires for an automatic lighting system comprising at least two luminaires (1) and at least one controller, each luminaire comprising a light source (4) and at least two communication ports (3, 6, 9, 12), wherein the communication ports have predetermined configuration and orientation (3, 6, 9, 12), each communication port (3, 6, 9, 12) is adapted to be communicatively connected to a communication port of another luminaire (1) in said network in the direction and orientation of the port (3, 6, 9, 12), and wherein the identification of unused communication ports (3, 6, 9, 12) is communicated to said at least one controller. The invention further relates to a plug (20, 21, 24, 28) adapted to be inserted into unused communication ports (3, 6, 9, 12) in a luminaire of a network of luminaires (1), said plug (20, 21, 24, 28) being adapted to indicate to a controller (7) in said network that the communication port (3, 6, 9, 12) is unused for communication to another luminaire; and to a method of auto-commissioning of a network of luminaires, wherein the method comprises the steps of: identifying unused communication ports (3, 6, 9, 12), communicating identified unused ports to said at least one controller, and control at least one luminaire as a function of the received information related to unused communication ports.

20 Claims, 2 Drawing Sheets

(58) Field of Classification Search
CPC ... H05B 33/083; H05B 33/0854; H05B 33/086;
H05B 37/02; H05B 37/0254
USPC ............... 315/149–158, 291–308, 312, 72, 7
IPC ............... H05B 33/0854,37/0245; Y02B 20/40
See application file for complete search history.

(56) References Cited

U.S. PATENT DOCUMENTS

| | | | |
|---|---|---|---|
| 2005/0200308 A1* | 9/2005 | Rimmer | ............... H05B 41/245 |
| | | | 315/291 |
| 2006/0125426 A1 | 6/2006 | Veskovic et al. | |
| 2008/0218334 A1 | 9/2008 | Pitchers et al. | |
| 2009/0027891 A1* | 1/2009 | Hikmet et al. ........... 362/296.02 | |
| 2010/0026614 A1 | 2/2010 | Blackwell et al. | |
| 2010/0262297 A1* | 10/2010 | Shloush et al. ............... 700/276 | |

FOREIGN PATENT DOCUMENTS

| | | |
|---|---|---|
| EP | 2239998 A2 | 10/2010 |
| JP | 2007149344 A | 6/2007 |
| JP | 2007150834 A | 6/2007 |
| JP | 2009517830 A | 4/2009 |
| WO | 2006096315 A2 | 9/2006 |
| WO | 2007138494 A1 | 12/2007 |

* cited by examiner

AUTO COMMISSIONING AND ENERGY SAVING LIGHTING SYSTEM

FIELD OF THE INVENTION

The present invention relates generally to an auto commissioning system for a network of luminaires. More particularly, the present invention relates to a network of luminaires for an automatic lighting system, a plug to define surrounding elements to the boundary luminaires in the network and a method to utilize them.

BACKGROUND OF THE INVENTION

When installing professional lighting cost plays a major role. The three main parts of the cost are the luminaires, the installation and commissioning, and the energy. There are a number of ways these costs can be reduced. Cheaper luminaires may for example be used, which will reduce the cost in the short perspective, but may prove expensive if the quality is affected by the price and the luminaires in the system have to be exchanged prematurely. Another possibility is to use more energy efficient luminaires, which is a good idea to reduce energy costs. LEDs and fluorescent tube lights are usual choices to minimize energy requirements. However, a luminaire that is off uses even less energy. Luminaires can be switched off when nobody is in the room or corridor. Often a sensor is placed in the ceiling to detect presence of a person. However, this usually results in a sub-optimal light distribution, or a sub-optimal dimming because the field of view of the sensors is limited. For example, the sensor may miss a presence resulting in switching the light off while somebody is there. Another example is that the lighting in the entire room or corridor is switched on while only a portion is occupied. Adding a sensor also makes the installing and commissioning more difficult and costly.

There is thus a need to produce a lighting solution that saves costs in terms of shutting the luminaires off while still keeping the installation and commissioning costs down.

SUMMARY OF THE INVENTION

It is an object of the present invention to improve the current state of the art, to solve the above problems, and to provide an improved method and device for saving energy in auto-commissioned lighting systems. These and other objects are achieved by a network of luminaires for a lighting system comprising at least two luminaires and at least one controller, each luminaire comprising a light source and at least two communication ports, wherein the communication ports have a predetermined configuration and orientation, each communication port being adapted to be communicatively connected to a communication port of another luminaire in said network in the direction and orientation of the port, and wherein the identification of unused communication ports is communicated to said at least one controller.

Unused communication ports indicate that the network of luminaires is not extending in the direction of the communication port. It may indicate the boundaries of a room, e.g. walls or windows, which are close to that side of the luminaire. The luminaires in the network may use this information, next to other information available from the network, to define their light output. All luminaires close to the walls may, e.g., switch on upon a global presence detection or global activation of the lighting system in the room to provide a good vertical illumination of the walls and avoid the perception of being in a dark space, while the luminaires in the center of a room may only switch on upon local presence or local activation detection. In that way, a lighting system that saves a lot of energy is realized.

To easily setup a network grid for the network of luminaires, the communication ports of each luminaire are preferably located in at least two different directions at different angles in the physical plane of the network of luminaires. In one embodiment, the luminaires comprise four communication ports, the communication ports being positioned in four different directions at 90° angles relative to each other. This allows the creation of an orthogonal grid. In that case, it is easy to combine the luminaires in a two-dimensional grid and connect an arbitrary number of luminaires in communicative connection. Each luminaire may have a connection to another luminaire in, e.g., east, west, north, and south. If the luminaire network covers the entire ceiling of a room, the luminaires being equidistantly placed, the absence of a communicative connection on a particular communication port of a luminaire will indicate that an obstacle or boundary of the network grid is present at that particular location and in that particular direction, e.g. the presence of a wall in that particular direction. If a hole in the grid is present, it is likely a pillar or a similar constructional device in the building. A controller controlling the system may chose to alter the illumination in the areas close to where obstacles have been detected. In another embodiment, the luminaires may have three communication ports at 120° angle relative to each other for creating a triangular or hexagonal grid. In still another embodiment, the luminaires may have two communication ports at 180° angle, i.e. opposite directions, for creating a linear grid of luminaires.

The communication between luminaires in the network of luminaires according to the present invention, realized through said communication ports, preferably included peer-to-peer communication. This is especially useful in embodiments of the present invention wherein each luminaire comprises a controller. Each luminaire may further comprise a presence detection sensor, a daylight sensor, a sound sensor, and/or a movement sensor. When each luminaire comprises a controller the control of the lighting system may either be performed by one of the controllers or be distributed across the controllers in the network. The peer-to-peer communication between luminaires may establish a situation where every luminaire potentially has information on every other luminaire in the network. As the respective positions of the luminaires are known, provided that the size and layout of the network grid is known, each luminaire may get information on presence detection in the room and on the distance from the detection location to the luminaire. If this distance is long, the controller of the luminaire might not dim up the light automatically and only if it is positioned near a wall, while if the distance from the detection location to the luminaire is small, the controller might automatically dims up the light without further consideration. In that way energy is saved while still providing the person present in the room with good 'local' light conditions and good 'orientation' light conditions e.g. by illuminating walls and pillars closeby. The presence sensor may use different techniques to detect presence such as for example an infra red sensor to sense body heat, a movement sensor, a sound sensor etc. The luminaire may also have an incorporated daylight sensor to tune the dim level according to the level of daylight.

The light source incorporated in the luminaires according to the invention may be a LED, a fluorescent tube, a laser, a FED device or an incandescent light source. The type of light source may be selected based on a desired effect or desired illumination profiles of the lighting system that is set up. LEDs are particularly relevant, since they are easy to incorporate in small armatures, very energy efficient and easy to dim and/or switch on and off.

According to a further embodiment of the present invention, the light source may comprise an adaptive beam shape. Ability to adapt the beam shape may be achieved by selecting a subset of a cluster of LEDs having lenses or reflectors that direct the emitted light in different directions. Alternatively the light source may have a single lens or reflector and incorporate clusters of LEDs at different locations relative to the optical axis of the lens or reflector. The advantage of the present invention is even more pronounced when using light sources with adaptive beam shape control. If the luminaire is positioned near a wall, far away from a person in the room, the luminaire may use the adaptive beam control feature to only illuminate the wall and not create unnecessary circumferential illumination where the light is not useful to anyone. If the luminaire is positioned near a window, the luminaire can be set to never use the beam towards the window, to avoid losing light in that direction and to avoid disturbing/polluting the outside environment by stray light.

The information that each communication port is able to communicate may be one of a human presence detection near the luminaire, a dimming level of the luminaire, an identification of unused communication ports, an information of equipment plugged into each communication port, and an information received from another luminaire in the network. Each luminaire is basically adapted to share all information it has on itself and its surroundings and forward information received from neighbouring luminaires, along with the identification and relative location of that luminaire. The type of information forwarded in the network may dependend on distance. For example, information on the presence detection of a person may be forwarded throughout the entire network to enable global lighting effects and orientation light against walls, pillars and the like to be effected, while the information on the location of a window or a wall might not be forwarded more than a few luminaires away in the network.

According to a further aspect of the invention, a plug is provided that is adapted to be inserted into unused communication ports of a luminaire in a network of luminaires, said plug being adapted to indicate to a controller in said network that the communication port is unused for communication to another luminaire. The information from the plug may comprise information on the surrounding in the direction and orientation of communication port it is inserted in, said information being adapted to be communicated to said controller. The information may for example be stored in a preconfigured memory part of the plug, which can be accessed by a controller. The functionality of the plug may also be realized by other means such as one or several switches e.g. thumbwheel switches adjacent the communication port, by short circuiting pins in or near by the communication port, etc. The information provided by the plug may further be any one of the following: identification of a window, a wall, a door (possibly including identification on optical properties such solid, transparent or semitransparent), a pillar, a table, a podium, a white or black board, a projection screen, a monitor or display.

As discussed above, the luminaire may be controlled based on the information comprised in the plug/switch/etc. If a white or black board or a projector screen or the like is indicated near one or more luminaires, the lighting system, when used in a presentation mode, may create an illumination profile where the luminaires close to the presentation surface are dimmed, at least in the direction of the presentation surface when these luminaires allow for adaptable beam shape control.

The invention further relates to a method utilizing auto-commissioning of a network of luminaires according to the above description, wherein the method comprises the steps of: identifying unused communication ports, communicating information on unused ports to at least one controller, and controlling at least one luminaire as a function of the received information on unused communication ports. A plug may be inserted in at least one unused port for providing information on the surrounding of the unused port and the step of controlling the at least one luminaire further is a function of the information provided by the plug. In a preferred embodiment, each luminaire in the network is controlled as part of the method.

Features of the luminaires, the network or the controls described above are also available as corresponding method steps and may for example include receiving and/or using information from one or more sensors (e.g. presence indication received from a presence sensor, indication of sound, movement or indication that nothing is sensed by a sensor), sharing information received from neighbouring luminaires with other luminaires in the network, etc. The advantages as discussed above in relation to the equipment features are of course also applicable to the corresponding method steps.

The skilled man realizes that the network connections described above, preferably peer-to-peer connections, could be achieved either via wires or via directed wireless transceivers inserted into the communication port(s) or mounted directly on the luminaire circuit board.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION FO THE EMBODIMENTS

Below detailed embodiments of the invention will be described. The luminaires according to these embodiments all have one sensor per luminaire and are outfitted with peer-to-peer communications with one or more neighbors allowing a good light distribution, energy saving and auto-commissioning of the luminaire network.

Figure 1:
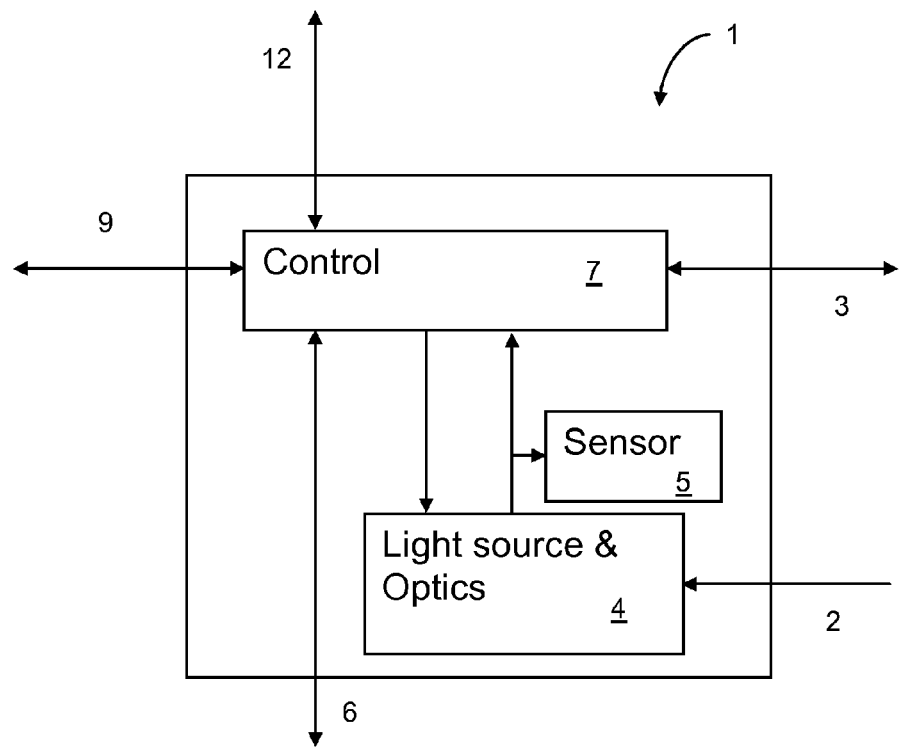
FIG. 1 is a diagram of a luminaire according to the present invention.

A functional diagram of a luminaire according to an embodiment of the invention is shown in FIG. 1. The luminaire comprises communication ports 12, 3, 6, 9 preferably located at the sides of the luminaire 1, for connecting with the neighboring luminaires in the corresponding directions 12, 3, 6, 9. This allows for a simple and intuitive auto commissioning. The luminaire 1 further has a power inlet 2, a light source with appropriate optics 4, a sensor 5 and a control unit 7. The communication ports 12, 3, 6, 9 are connected from the control unit 7. The diagram of FIG. 1 shows four communications ports oriented in directions which could be though to correspond with North, East, South and West directions. The luminaire outlined in FIG. 1 could intuitively be used to create a right-angled or orthogonal luminaire network.

Figure 2:
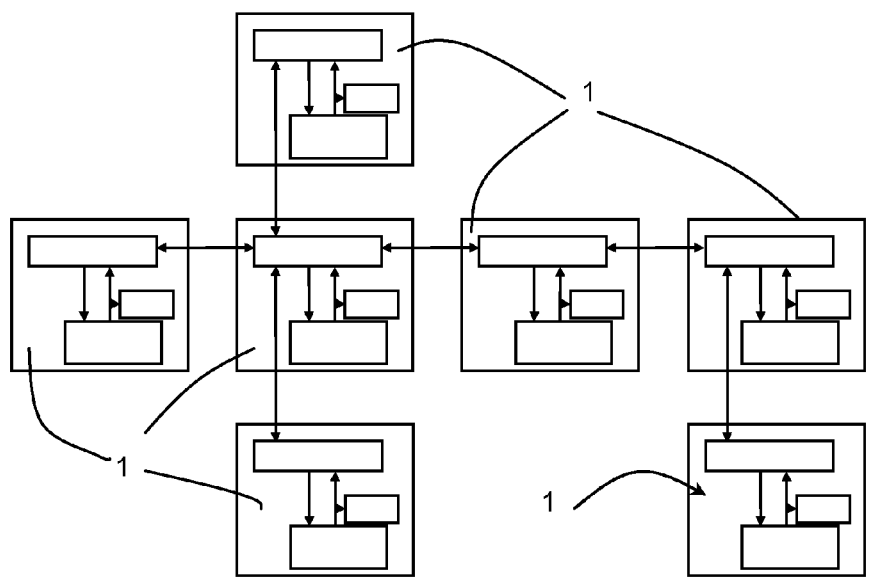
FIG. 2 is an example image of how a number of the luminaires of FIG. 1 can be connected to a network in accordance with an embodiment of the present invention.

An example of a network of luminaires is shown in FIG. 2. In this lighting system, the dim level of a particular luminaire may be determined by its own sensor, e.g. a presence detector 5, but also by the presence signals and/or dim levels of the neighboring luminaires.

Figure 3:
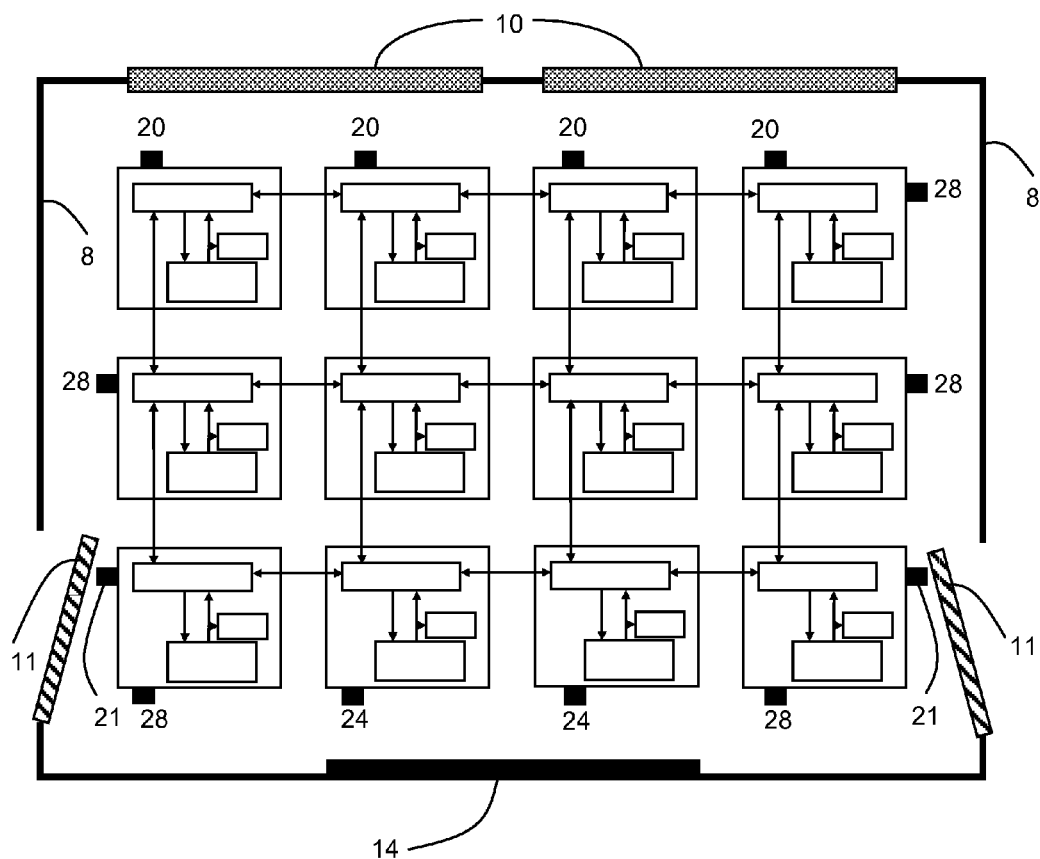
FIG. 3 is a diagram of a room equipped with a lighting system according to an embodiment of the present invention.

FIG. 3 shows an example of how the luminaires according to an embodiment of the present invention may be positioned in a square room having walls 8, two windows 10, two doors 11 and a presentation display area 14 on one wall. The layout is typical for e.g. a lecture room. The plugs 20, 21, 24, 28 indicate an interruption of the luminaire network in the corresponding direction and represent an obstacle that the luminaire in question faces in that direction, e.g. a wall 8, a door 11, a window 10 or a display area 14 for a projector or a white board or the like.

Figure 4:
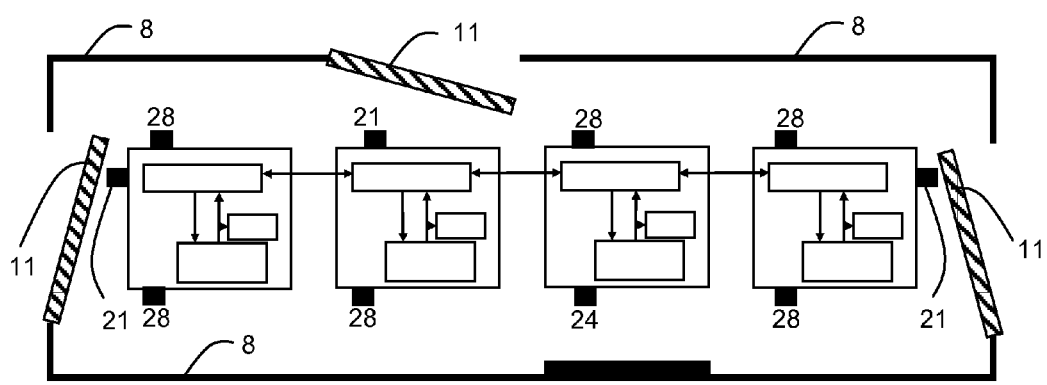
FIG. 4 is a diagram of a corridor equipped with a lighting system according to an embodiment of the present invention.

FIG. 4 shows an example of how the luminaires according to another embodiment of the present invention may be positioned in a corridor. The corridor has a door 11 at each end, a door 11 in the middle of the corridor to one side and a display area 14, e.g. a TV-display, mounted on one part of one of the corridor walls. Plugs 21, 24, 28 may indicate the kind of obstacle that the luminaire is facing in the direction of the communication port where the plug is plugged into. Therefore a plug according to the present invention may carry information on the surrounding space at that side of the luminaire where the plug is plugged in. The plugs 21, 24, 28 indicate for the control unit if the obstacle is a door 11, a wall 8, a TV-display 14 etc.

Now the functioning of the lighting system according to the present invention will be described with a few examples.

In its simplest form, a used communication port implies that the room continues in that direction, whereas an unused communication port may imply that a boundary of a room lies in the corresponding direction. Thus the luminaires in the center of the room can be distinguished from the luminaires close to the walls, without any installation or commissioning effort.

More detailed information about the type of room boundary, e.g. window, door, wall etc, could be provided by applying plugs 20, 21, 24, 28 to the unused communication ports that short-circuit specific pins, or connect certain pins with specific impedance values etc, which can be detected by the controller. That is, the plug, when plugged in an unused communication port, will provide predetermined information about surrounding space at that side of the luminaire according to the specific plug. The correct plug must thus be inserted when installing the lighting system in correspondence with to the placement of that particular luminaire. Another option would be to add a selection switch next to each communication port of the luminaire for choosing and identifying different kinds of boundaries or obstacles.

The information on boundaries or obstacles in a space may be used to improve the quality of the lighting and/or the dimming scheme for the illumination of that space. For example, the lightness of a space is mainly determined by the vertical (wall) illuminance, and less by the horizontal illuminance. To keep a open view on the space, it is preferred not to dim the lights close to the wall. Combining this with local presence detection could result in a possible scenario with the luminaires at the center of the room reacting to local presence, i.e. only dim up the light when and where people are present, and having the luminaires close to the walls 8 reacting to global (overall) presence so that they switch on when someone is present in the room, independent of his/her specific location in the room or distance from the luninaire. On the other hand, a high wall illuminance is not strictly required by regulations and energy savings could be increased further by keeping luminaires 1 close to the walls 8 at a lower dim level, while still illuminating the walls 8 for perception reasons. For luminaires 1 close to windows 10, most of the light in the direction of a window 10 is lost to the outside. In that case it is preferred to keep the luminaire at a low dim level until local presence of a person is detected and the luminaire is dimmed up. In another dimming scenario, the luminaires 1 close to the doors 11 could be used to highlight the entrances/exits, e.g. in case of an emergency. Luminaires close to obstacles like pillars may be handled as if the pillar was a wall 8, or if the pillar is to be hidden as much as possible, the luminaires could be dimmed down as much as possible close to the pillar when a view on the pillar is not needed by persons in the room. For luminaires close to a presentation display area 14, like a screen for projection in a lecture room, or a TV, the lighting could be adapted, e.g. dimmed, to optimize the quality of the presentation.

The invention is particularly powerful for luminaires 1 with beam control. Especially LED-based luminaires allow for easy control of the beam shape and/or direction, by separately controlling groups of LEDs inside the luminaire. For example, a particular cluster of LEDs inside the luminaire may be used for generating a particular beam of light in a particular direction; different clusters of LEDs inside the luminaire may then be used to generate different beams in different directions. Such LED-based luminaires, suitable for general illumination purposes, are commercially available. They allow for new functionalities, also referred to as "digital lighting". The various clusters of LEDs in the luminaire may be addressed by separate control units instead of one control unit. By switching on and off clusters of LEDs, beams in different directions may be switched on and off and the overall lighting effect caused by the luminaire may be adjusted. For example, by arranging multiple LEDs behind a large lens, the resulting beam direction may be changed by switching on different LEDs at different positions behind the lens, as needed e.g. in automotive headlight applications. A luminaire with adaptable beam is particularly useful in the present application to save energy.

As an application example, in case presence of a person is locally detected by a given luminaire 1 in the room, that luminaire could dim up that part of its beam that shines straight downward towards the detected person. The neighboring luminaires could use this detection signal to dim up the part of their light beam that is in the direction of the luminaire that detected the presence, i.e. in the direction of the person present. This allows for an even more efficient use of the light, since only the relevant parts of the beams from various luminaires are dimmed up, instead of whole beams.

In case luminaires with beam control are used near walls, the luminaires close to the wall could use a different dimming scheme for that part of their beam that is directed at the wall: e.g. the light aimed at the wall 8 may be linked to a global presence detection, whereas the light in the other directions may be linked with one or more local presence detectors. In another scenario, the luminaires close to a window 10 may switch off the beam segment that is aimed at the window 10, in order to save energy and reduce light pollution to the outside world.

When using clustered LEDs with adaptable beam shape as just described above, the LED cluster(s) could also include LEDs of different colors, e.g. red, green and blue (RGB). In that case the luminaire control unit 7 may present colored light towards, e.g., a wall 8, for esthetic purposes or for visual or spatial perception. That may be found attractive especially on large walls or in wide corridors for giving a person present in the space a good perception of the three-dimensional layout of the space. When installing the lighting system, one could, e.g., choose plugs 20, 21, 24, 28 with a different color indication, e.g. white, red, green, blue, yellow, or any other color, to indicate what color the control unit should choose for the illumination of the wall, window, door or display area. Plugs 20, 21, 24, 28 configured to instruct the control unit to change color over time would also be possible.

A further option to give the lighting system even further dimming scenario possibilities is to add a fifth communication port (not shown) on each luminaire or certain luminaires where that communication port (not shown) has a position facing the floor and is oriented in a direction towards the floor. In that case information about furniture or intended use of the floor area under the luminaire may be added via insertion of a plug. If desks in a lecture room are underneath luminaires, it may be desired in presentation scenario to dim down all but the vertical parts of the light beam. This would result in a projected image on a presentation screen somewhere in the room not being illuminated and therefore visible to person(s) sitting at the desk(s) while at the same time providing enough light at the desk itself for making notes. If a flower or plant is permanently placed somewhere in a room, it may e.g. be included in the global lighting scheme, as with wall illumination, to give a person in the room a view on the plant. In addition, the lighting scheme may be blended with or take into account a time schedule to allow the plant to receive enough light for growing. The same may be desired for a statue, presentation object or the like.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. A network of luminaires for a lighting system comprising at least two luminaires and at least one controller, each luminaire comprising a light source and at least two communication ports, wherein
    the communication ports have predetermined configuration and orientation, and are located in at least two directions at different angles in a plane of the network of luminaires,
    wherein each communication port is adapted to be communicatively connected to a communication port of another luminaire in said network in the direction of the orientation of the communication port,
    wherein each communication port is adapted to identify when the communication port is unused for communication with another luminaire and communicate information indicating that the communication port is unused for communication with another luminaire to said at least one controller, and
    wherein at least one luminaire of said luminaires is configured to control a light output as a function of the information.

2. The network of luminaires according to claim 1, wherein the each communication port is adapted to receive a plug for indicating that the communication port is unused.

3. The network of luminaires according to claim 1, wherein said communication between luminaires through said communication ports is peer-to-peer communication.

4. The network of luminaires according to claim 1, wherein said communication is established via a network established either by wires between different ports or via directed wireless transceivers included in said communication ports.

5. The network of luminaires according to claim 1, wherein each luminaire comprises a controller.

6. The network of luminaires according to claim 1, wherein each luminaire further comprises at least one sensor selected from the group consisting of: a presence sensor, a daylight sensor, a sound sensor, and a movement sensor.

7. The network of luminaires according to claim 1, wherein the light source is selected from the group consisting of: a LED, a fluorescent tube, a laser, a FED device, and an incandescent light source, and wherein the light source is arranged to provide an adaptive beam shape.

8. The network of luminaires according to claim 7, wherein said adaptive beam shape is achieved by a cluster of LEDs wherein the LEDs project light in different directions.

9. The network of luminaires according to claim 1, wherein the communication between communication ports of different luminaires is adapted to communicate at least one information comprised in the group of:
    a human presence near the luminaire, a dimming level of the luminaire, a detected daylight level, an identification of unused communication ports, an information of equipment plugged into each communication port, and an information received from another luminaire in the network.

10. A plug adapted to be inserted into an unused communication port of a luminaire in a network of luminaires according to claim 9, said plug being adapted to indicate to a controller in said network that the communication port is unused for communication to another luminaire.

11. A plug according to claim 10 wherein the plug comprises information on the surrounding space of the luminaire in the direction of the orientation of the communication port it is plugged into, said information being adapted to be communicated to said controller.

12. A plug according to claim 11 wherein said information on the surrounding is one contained in the group of: a window, a wall, a door, a solid door, a transparent door, a semitransparent door, a pillar, a table, a podium, a white or black board, a projection screen, a monitor or display.

13. A method of auto-commissioning of a network of luminaires according to claim 9, wherein the method comprises the steps of:
    identifying unused communication ports, communicating information on unused ports to said at least one controller, and
    controlling at least one luminaire as a function of the received information on unused communication ports.

14. The method according to claim 13, wherein a plug is plugged into at least one unused communication port of a luminaire and the step of controlling at least one luminaire in the network of luminaires further is a function of the information on the surrounding received from the plug.

15. The method according to claim 13, wherein the step of controlling at least one luminaire further is a function of information received from said sensor.

16. The method according to claim 13, wherein the step of controlling at least one luminaire further is a function of information received from other luminaires.

17. The method according to claim 13, wherein the step of controlling at least one luminaire comprises controlling a beam shape of the luminaire.

18. The network of luminaires according to claim 1, wherein the at least one luminaire is configured such that, when at least one of the communication ports of the at least one luminaire is unused for communication with another luminaire, the at least one luminaire controls the light output on the basis of the location of the unused port.

19. The method according to claim 13, wherein the controlling comprises controlling a light output of the at least one luminaire as a function of a location of at least one of the unused communication ports.

20. The network of luminaires according to claim 1, wherein the light output is emitted by a given luminaire of the at least one luminaire and wherein the given luminaire is configured to control the light output as a function of the information, which is communicated by a given port of the given luminaire.

* * * * *